(12) United States Patent  (10) Patent No.: US 8,086,528 B2
Barrett et al.  (45) Date of Patent: Dec. 27, 2011

(54) TRANSACTION AGGREGATOR

(75) Inventors: Melyssa Barrett, Tracy, CA (US); Joe Scott, Pacifica, CA (US); Nancy Hilgers, Danville, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 12/824,030

(22) Filed: Jun. 25, 2010

(65) Prior Publication Data

US 2010/0262536 A1  Oct. 14, 2010

Related U.S. Application Data

(63) Continuation of application No. 12/616,048, filed on Nov. 10, 2009.

(60) Provisional application No. 61/116,207, filed on Nov. 19, 2008.

(51) Int. Cl.
*G06Q 40/00* (2006.01)
(52) U.S. Cl. .......................................................... 705/38
(58) Field of Classification Search ............... 705/35–45
See application file for complete search history.

(56) References Cited

U.S. PATENT DOCUMENTS

| 6,658,393 | B1 | 12/2003 | Basch et al. |
| 7,451,134 | B2 | 11/2008 | Krackowiecki et al. |
| 2004/0010458 | A1 | 1/2004 | Friedman |
| 2007/0140483 | A1 | 6/2007 | Jin et al. |
| 2007/0162457 | A1 | 7/2007 | Barcia et al. |
| 2007/0214076 | A1 * | 9/2007 | Robida et al. ................... 705/38 |

FOREIGN PATENT DOCUMENTS

| JP | 2007-219651 A | 8/2007 |
| KR | 10-2004-0017547 A | 2/2004 |

OTHER PUBLICATIONS

U.S. Appl. No. 12/616,028.
International Preliminary Report on Patentability for Application No. PCT/US2009/065167, dated Jun. 3, 2011, 5 pages.

* cited by examiner

*Primary Examiner* — Rajesh Khattar
(74) *Attorney, Agent, or Firm* — Kilpatrick Townsend & Stockton LLP

(57) ABSTRACT

Systems and methods for determining and reporting aggregated transaction level data regarding a particular user are disclosed. Based on the requests of one or more information requesters, an aggregator server can request transaction level data for all accounts associated with a particular user from a transaction database. The transaction database returns raw transaction level data for all accounts associated with the particular user to the aggregator server. The aggregator server can then parse the raw transaction level data based on a number of transaction level data elements and information requester input. The parsed raw transaction level data can then be used to determine the number of predefined or information requester defined transaction level data aggregates. The resulting transaction level data aggregates can then be sent in a report to the one or more information requesters.

15 Claims, 9 Drawing Sheets

TRANSACTION AGGREGATOR

CROSS-REFERENCES TO RELATED APPLICATIONS

This Application is a continuation of U.S. patent application Ser. No. 12/616,048, filed on Nov. 10, 2009, which claims priority to U.S. Provisional Patent Application No. 61/116,207 filed on Nov. 19, 2008, and is also related to U.S. Non-Provisional Patent Application 12/616,028 filed on Nov. 10, 2009. All applications (provisional and non-provisional) are herein incorporated by reference in their entirety for all purposes.

BACKGROUND

Various tools, systems and products exist to assist various entities assess the risk, marketing value, success of marketing efforts, consumer loyalty and detect fraud. Such tools are especially useful for helping credit issuers when assessing the initial and continued credit worthiness of a user with regard to a credit account, targeting offers and evaluating the chances of a user declaring bankruptcy. The methodology of a conventional system for providing risk assessment or scoring is illustrated in the flowchart depicted in FIG. 1A.

Starting at step 10, a risk assessment network receives a user inquiry from an information requester, such as a credit card issuer. One example of a network is a payment processing network typical in a credit card payment processing network. The user inquiry received from the information requester can include user identification information such as the user's name, address, phone number, Social Security number and date of birth. The inquiry can also include a request for a risk assessment summary or a credit score.

At step 15, the network sends a file with contents of the user inquiry to one or more data sources. In response to the file, the one or more data sources send account level data and the network receives the account level data at step 20. In many conventional risk assessment systems, account level data can include a number of account numbers associated with the user indicated in the user inquiry. Using the account level data, usually the account numbers, the network queries a transaction database for transaction level data in step 25. Such transaction level data can include details of individual transactions conducted with each of the accounts associated with the user. The network then analyzes the transaction level data to determine the risk assessment summary or credit score according to internal network protocols, policies and algorithms in step 30. Finally, in step 35 the network sends the risk assessment summary or credit score to the information requester.

The risk assessment summary provided by the network is typically the same regardless of which information requester requested the summary. Such standardization of risk assessment summaries and credit scores, while providing consistent and concise metrics of risk, do not allow for a means to provide customized reports or analysis of the transaction level data according to internal needs of each information request. Depending on the size and sophistication of each individual information requester, each information requester may have specific transaction level data needs to run their own internal risk assessment policies; protocols and regulations as determined by their target customers and account portfolio. Current risk assessment networks cannot provide transaction level data aggregates across multiple accounts customized to the requirements of an individual information requester.

Embodiments of the present invention address this and other deficiencies of conventional risk assessment systems and methods.

BRIEF SUMMARY

Various embodiments of the present invention include methods for deriving aggregated transaction data are provided. The method includes sending a transaction data inquiry from an aggregator server to a transaction database. The aggregator server receives a transaction data response file from the transaction database and parses the transaction data response file according to requests for aggregated data. The aggregator server can determine aggregated transaction data from the parsed transaction data.

In other embodiments, systems for deriving aggregated transaction data are provided. The system can include a memory and a processor, wherein the processor is configured to receive a transaction data response file from a transaction database, parse the transaction data file according to a plurality of model transaction aggregates stored in the memory and determine aggregated transaction data from the parsed transaction data.

DETAILED DESCRIPTION

The present invention is directed to systems and methods for efficiently and cost-effectively reporting aggregated user, account and transaction level information to multiple information requesters. For example, embodiments of the present invention can be used to report user information and aggregated transaction data to multiple credit account issuers for the purpose of anticipating or managing the risk of user bankruptcy or other account risks.

Figure 1A:
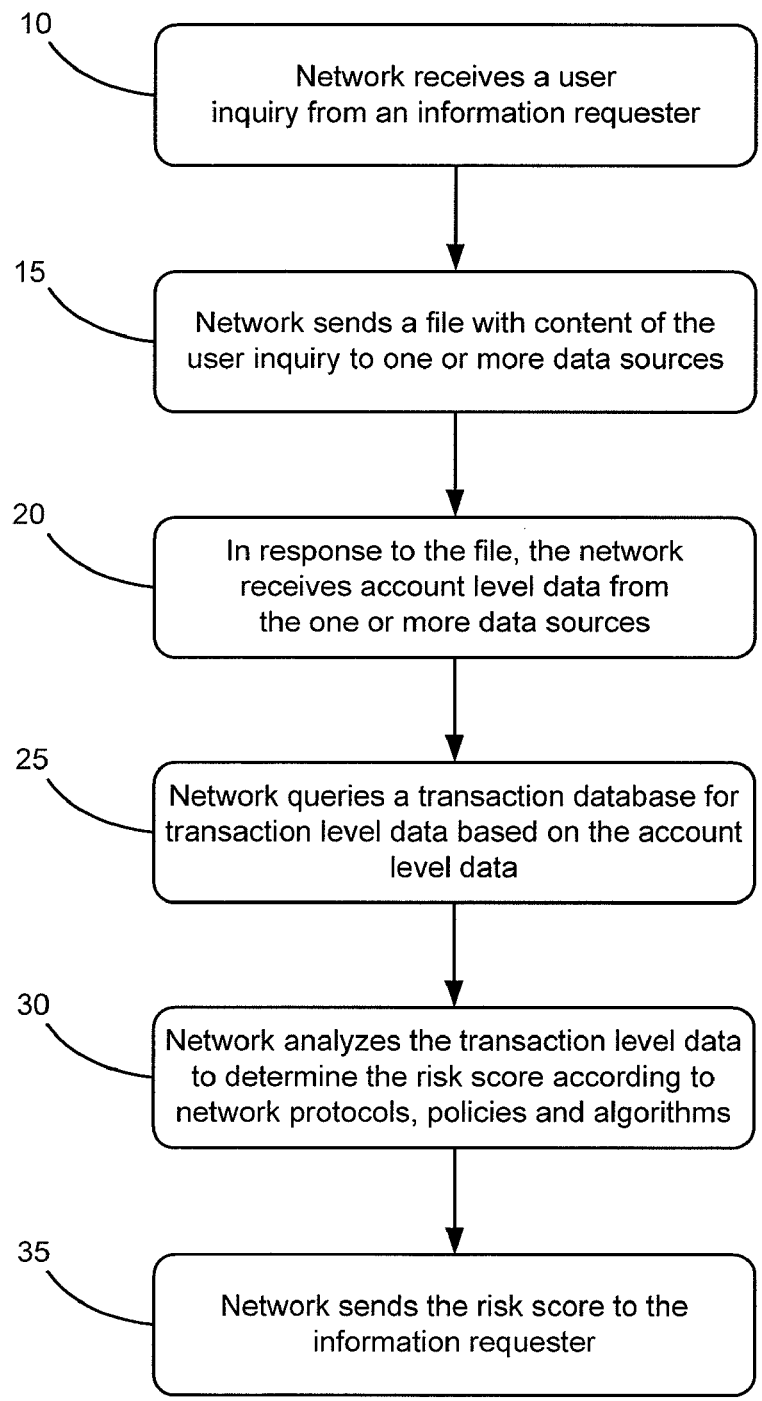
FIG. 1A depicts a flow chart of a current method for reporting user and account level information in response to individual user information inquiries.
Figure 1B:
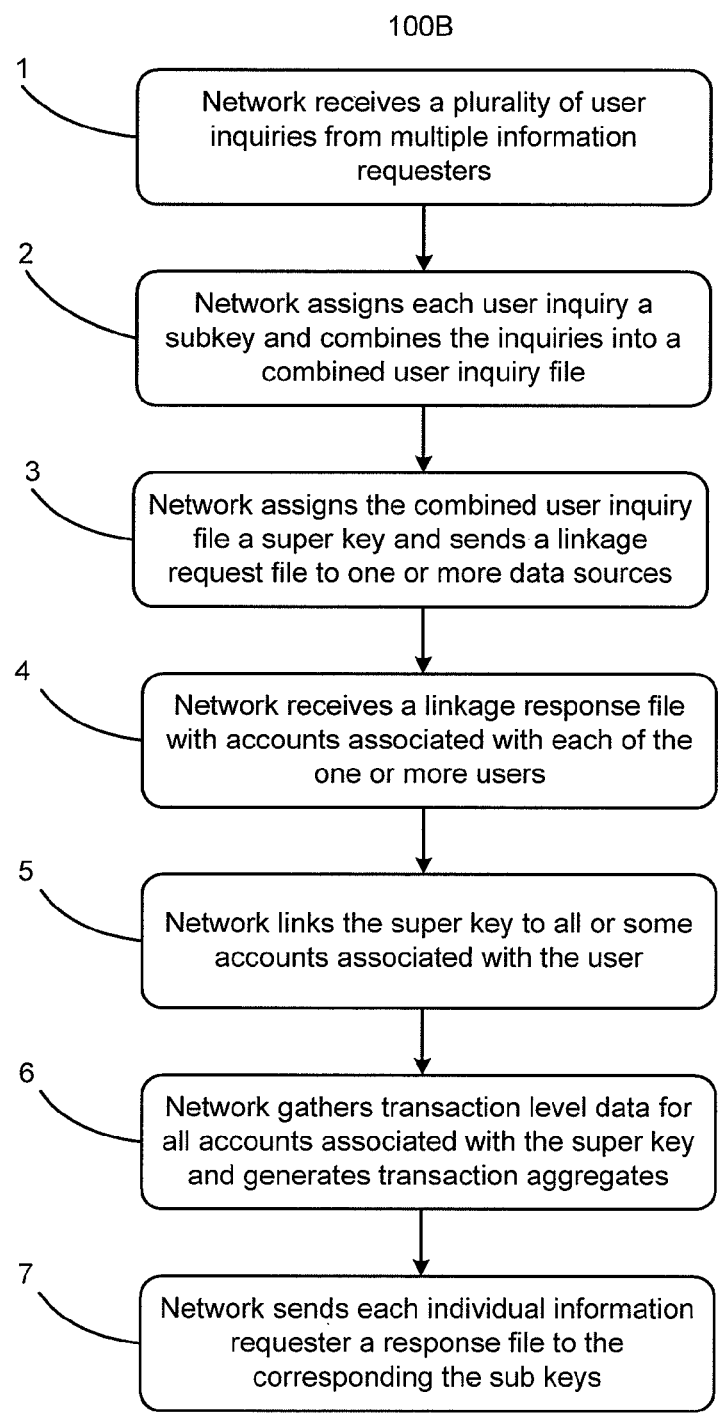
FIG. 1B depicts a flow chart of a method for reporting user and transaction level information in response to a plurality of user information inquiries according to one embodiment of the present invention.

FIG. 1B depicts a flow chart of a method 100B for processing user inquiries from multiple information requesters according to one embodiment of the present invention. Method 100B can be performed by any appropriate computer or server system running appropriate computer readable code in a network for processing account applications and/or transactions. In step 1, the network receives a plurality of user inquiries from multiple information requesters. As examples, information requesters can be banks or other credit issuing institutions or entities. In some embodiments, a server can receive the user inquiries for the network. The server can receive the plurality of user inquiries over various communication media including, but not limited to, the Internet, proprietary communication channels, wireless networks or any other suitable communication media. For example, in the credit card industry, the server can receive the plurality of user inquiries over any existing transaction or communication channels used for authorizing transaction or communicating user credit card account applications.

Once the network receives the plurality of user inquiries, the server can assign each of the plurality of user inquiries a subkey to identify the specific inquiries made by each of the information requesters in step 2. For example, three credit-issuing banks, or issuers, can send the network three separate user and/or account inquiries regarding the same user. The user may have many accounts and may have those accounts spread over multiple issuers and each of the credit issuing-banks may require composite information about some or all of the user's accounts. To identify which user inquiry came from which bank, the network can refer to the assigned subkey. The subkey can be used by the network to route communication to and from each bank regarding information about the user and the corresponding account level and transaction level information.

Next, the network can combine the plurality of user inquiries into a single combined user inquiry. In some embodiments, the plurality of user inquiries can be multiple user inquiries regarding the same user. In other embodiments, the plurality of user inquiries can be multiple user inquiries regarding a plurality of users. In yet other embodiments, the multiple user inquiries can include multiple information requests for one or more of a plurality of users from a plurality of different information requesters.

Once the combined user inquiry is generated, it can include user inquiries and user identification information, or identifiers, from multiple information requesters about the same user or users. For example, a user inquiry can include requests for the total amount of available credit and the composite or aggregated amount and age of any outstanding balances across all accounts associated with the user. Additionally, the combined user inquiry can include user information such as the user's name, Social Security number, address, phone number, date of birth and other user identifying information for multiple users. The combined user inquiry can contain duplicate information and information requests depending on what information is requested by each of the information requesters. Such duplicate inquiry information and information requests can be information that is of interest and allowable to one or more of the information requesters. For example, more than one information requester might be interested in the credit score, recent spending patterns, recent credit card acquisitions, amount of unpaid credit card account balances, repayment history and other non-account specific aggregated transaction level data for a particular user. In such cases, the one or more of the duplicate information requests regarding the particular user can be deleted before the final combined user inquiry is compiled.

Since the combined user inquiry can contain duplicate information requests, various embodiments of the present invention can delete the duplicate information requests. In some embodiments, an aggregator can be configured to detect and delete the duplicate user inquiries. By deleting the duplicate information requests from multiple information requesters, such as banks, the network can route and request information from various data sources more quickly and efficiently. This provides the benefits of reducing the cost to the network and the information requesters.

In step 3, if the combined user inquiry includes only multiple user inquiries regarding a single user, the network can assign the combined user inquiry a single super key to link all the of the information requests and resulting responses to the user. In other embodiments in which the combined user inquiry includes one or more user inquiries regarding a plurality of users, the network can assign each user a super key to identify each user and link each information request and the resulting responses to the corresponding user. In various embodiments, the super key can be used to identify the user inquiry file and a particular user associated with that file. Additionally, the super key can provide a link between multiple accounts issued by multiple issuers to a single user. The super key can link or tag all information linked to a particular user. Additionally, the super key can link the subkeys assigned to each of the incoming user inquiries received by the network.

As used herein, the terms user inquiry, user inquiry message and user inquiry file can be used interchangeably to refer to any electronically stored or transmitted document, string, vector or other data structure that can contain user identification and/or inquiry or request information. For example, a user inquiry can be a comma or tab delineated ASCII file or a compiled machine-readable file in binary code. In some embodiments, the user inquiry can be encrypted. Each user inquiry can include a request for specific aggregated transaction level or account level information based on all accounts linked to a particular user by the corresponding super key.

In embodiments in which the network assigns a super key, the network can send the combined user inquiry file or portions of the combined user inquiry file (may include user identifier information) as a linkage request file to one or more data sources to determine some or all accounts associated with each of the one or more users identified in the combined user inquiry file and associated with a super key. In some embodiments, the network sends the super keys with the linkage request file so responses from the data sources can be associated with the super keys at the data source. In other embodiments, the super keys are not sent to the data sources and the network can reference identifiers provided by the data sources to link accounts to the super keys. For example, the network can associate a super key to a data source identifier provided in a response to the linkage request file. In such embodiments, the data received from each data source can be tagged with the data source identifier to preserve information regarding the source of any information the network might store or send to various entities including the information requesters.

After the network sends the linkage request file to one or more data sources, it can receive responses to the linkage request file from the one or more data sources in the form of one or more linkage response files in step 4. The linkage response file can include user account data. For example, the linkage response file can include a listing of the account numbers for all or some of the accounts associated with a particular user linked to the super key or an identifier generated and provided by the data source.

In step 5, the network links the super key to all or some of the accounts or account numbers contained in the linkage response file. In embodiments in which the network provides the super key with the linkage request file sent to the data sources, the data sources can return the linkage response file with a listing of account numbers associated with the particular user by linking the account numbers to the super key. In such embodiments, the network can use the link between the account numbers and the super key provided by the data sources. In other embodiments, each data source can provide data source-specific identifiers that the network can link to the super key. The network can then use data source-specific identifier linked to the super key to track the source of specific user/account information for later reference by the network, the information requesters or the user. The super key can also be used to link the plurality of user accounts associated with a particular user. In this way, the super key can be used to identify a particular user, all the accounts associated with that user and any gathered or aggregated user, account or transaction level data.

Depending on the agreement and communication connections between the network and the one or more data sources, the linkage request file can be submitted to the one or more data sources individually or as part of a batch process in which multiple information requests regarding multiple users are submitted to the one or more data sources at predetermined intervals or in predetermined batch sizes. In embodiments in which the linkage request file are sent to one or more data sources as part of a batch, the super key assigned to each user can be used to link information in each of the one or more data sources to each particular user.

In step 6, the network can submit a super key that is linked to a particular user and some or all accounts associated with the user to a user or transaction database to gather transaction level data across all the accounts. For example, the network in a credit card transaction system can submit a super key and the account numbers for all the credit card accounts associated with a particular user. The transaction database can then return raw, unprocessed, transaction level detail data for all the accounts listed in the linkage response file sent by a data source. As used herein, raw transaction level data can include unparsed transaction level detail data as it is received from the transaction database. Such transaction level detail data can include the date, time, location, type and amount for each transaction processed with all the accounts associated with a particular user. In some embodiments, raw transaction level data will need to be processed, parsed or reformatted before it can be analyzed and used to compile transaction level aggregates or attributes.

In some embodiments, the network itself can include one or more user or transaction databases, while in other embodiments, the network can receive raw transaction level data from external user or transaction databases. For example, if the network is a payment transaction-processing network, the network can include user information or a transaction databases. The user information database can be a data source used to store and report on the history of user information as compiled in account acquisitions while the transaction database can be a data source used to report up-to-date transaction profile information and transaction history of transactions processed using various user accounts.

In response to a super key and transaction information requests submitted to the user or transaction database, the network can receive raw transaction level data regarding accounts associated with a particular user. The raw transaction data can be a listing of individual transactions conducted with some or all of the accounts associated with the user. Such individual listings of transactions can be linked to the super key and include information such as account designations or identifiers, account numbers, entity identifiers and the amount, type, time and date of each transaction. The network can then aggregate each of the individual transactions into any type of statistic or report requested by the information requesters and link the statistic or report to the super key and the corresponding subkey originally assigned to the user inquiry that included the request for the particular statistic or report received from the information requesters.

In some embodiments, the aggregator can be run and/or hosted by a third party entity external to the network. In other embodiments, the aggregator can be part of the network, the transaction server or the transaction database.

From the data stored in the transaction database, the network can use the aggregator to calculate or otherwise determine summaries of spending patterns over various periods of time, summaries of types of spending, totals for spending at particular vendors or entities and the like. One advantage of various embodiments of the present invention is that each information requester can customize the aggregated information, statistics and reports it receives from the network per the requirements of each information requesters' internal risk management and bankruptcy prediction algorithms, protocols and policies.

Once the network gathers, determines or otherwise calculates transaction level aggregated data, also referred to as transaction level aggregates or attributes, the network in step 7 can respond to the original plurality of user inquiries with the corresponding aggregates based on the subkey originally assigned to each of the received user inquiries. In some embodiments, each information requester is to receive only the aggregated data, statistics or report it requested in its user inquiry. In other embodiments, the network can send unsolicited aggregated transaction level data it determines to be necessary or relevant to a particular information requesters internal risk management or bankruptcy predictions policies, protocols or algorithms.

Various embodiments of the present invention can also be used to collect transaction level data and provide aggregates or attributes on levels other than the consumer level. For example, consumers can be grouped based on region of residence, demographic information, classification of consumer type, etc. Such grouping can be very helpful for providing offers to particular groups of consumers when approaching them with targeted group marketing.

Figure 2:
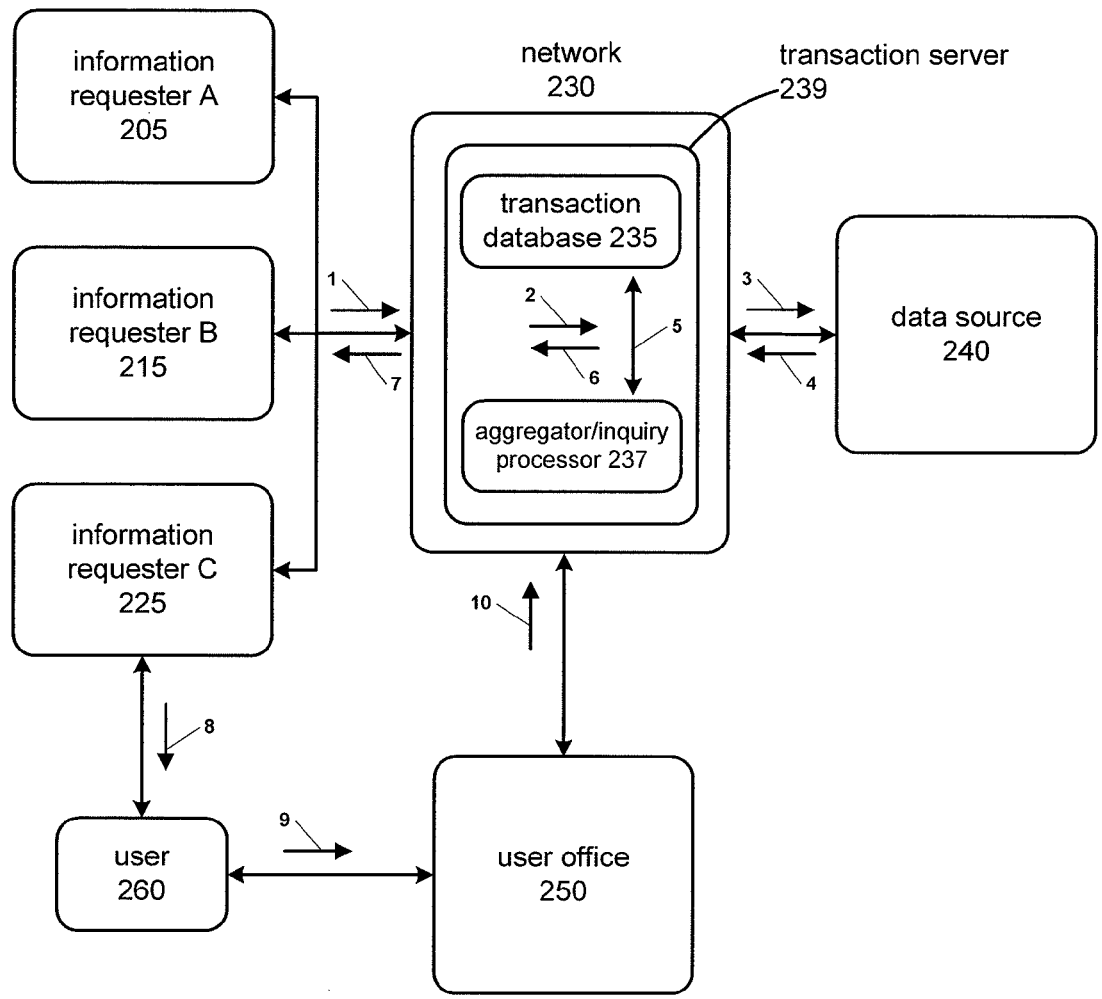
FIG. 2 depicts a schematic diagram of a system for combining multiple user information inquiries and reporting aggregated transaction level data to multiple information requesters according to one embodiment of the present invention.

FIG. 2 is a schematic of a system for combining user inquiries from multiple information requesters and aggregating user or transaction level data according to the method 100B depicted in FIG. 1B. The functionality of the various components of the system 200 for combining user inquiries for multiple information requesters and reporting aggregated user or transaction level data will be described with reference to the steps in method 100B as they correspond to the data flow indicated by the numbered arrow indicating the steps in FIG. 2.

The system 200 can include a network 230. The network 230 can be any network or association for handling user account transactions or inquiries. In some embodiments, network 230 includes a transaction server 239. Transaction server 239 can be a computer system that runs computer readable code to receive process, settle and reconcile various transactions managed by network 230. In some embodiments, transaction server 239 can include a transaction database 235 and an aggregator 237. Transaction database 235 can be connected or otherwise networked to aggregator 237. Furthermore, network 230, and consequently transaction server 239, can be in communication with a plurality of information requesters. Each of the connections in FIG. 2 is a possible communication route among information requester A 205, information requester B 215, information requester C 225, network 230, data source 240, user office 250 and user 260. Next to each connection is a numbered arrow indicating the flow of information corresponding to the numbered steps in method 100B depicted in the flowchart in FIG. 1B.

In some embodiments, transaction server 239 can receive multiple user inquiries from multiple information requesters as shown by the connections between information requester A 205, information requester B 215, information requester C 225 and transaction server 239. Transaction server 239 can be configured to receive user inquiries over any appropriate communication media from the information requesters. In some embodiments, the communication medium can be the Internet, a proprietary communication network 230, a wireless network or other appropriate telecommunications or data connections.

As shown in FIG. 2, transaction server 239 can receive user inquiries from information requester A 205, information requester B 215 and information requesters C 225 in step 1. In some embodiments, information requesters A through C can be credit issuing banks. Each of the credit issuing banks can send in a user inquiry regarding one or more users and include requests for information regarding any accounts that that bank has opened related to those users as well as aggregated transaction level data.

As previously described in reference to FIG. 1B, when transaction server 239 receives a plurality of user inquiries, it assigns a subkey to each one of the user inquiries. The subkey can identify the particular information requester that sent in the user inquiry and can be referenced later when the transaction server 239 sends a user inquiry response file to one or more of the information requesters. In some embodiments, each information requester can provide its own subkey when it submits the user inquiry.

Transaction server 239 can analyze the plurality of user inquiries it has received. In some embodiments, if the transaction server 239 determines that more than one of the user inquiries relates to the same user as another user inquiry, then the transaction server 239 or aggregator 237 can combine those user inquiries into a single combined user inquiry file in step 2.

In some embodiments, transaction server 239 or aggregator 237 can also assign a super key to the combined user inquiry file or the user in step 2. Transaction server 239 or aggregator 237 can send the combined user inquiry file to data source 240 in step 3 as a linkage request file. The linkage requested file can include a request to link all accounts associated with a particular user to the super key associated with the particular user.

In some embodiments, data source 240 can be a plurality of data sources. For example, data source 240 can be one or more credit reporting bureaus. In other embodiments, data source 240 can include a fraud database. In yet other embodiments, data source 240 can include a transaction database such as transaction database 235. As previously mentioned, transaction database 235 can alternatively be integrated into transaction server 239 within network 230.

In various embodiments, transaction database 235 can store and organize various transactions processed by network 230. Transaction level detail stored in transaction database 235 can be processed to produce specific summary information in response to the plurality of user inquiries. For example, in a credit card payment processing network, some user inquiries might request information that summarizes specific types of transaction details such as the amount and frequency of payment transactions. In other embodiments, transaction database 235 can store and organize user account data. In such embodiments, it is possible for information requesters to submit user inquiries to request summary data regarding the application velocity of any and all data submitted in an application stored in transaction database 235.

In step 4, transaction server 239 can receive a linkage response file from data source 240. The linkage response file can include the super key included in the initial combined user inquiry file sent by the transaction server 239. In step 5, transaction server 239 can gather transaction level information in transaction database 235 for all accounts linked to the particular super key and user. In some embodiments, aggregator 237 can analyze and/or summarize the transaction level information based on user inquiries linked to the super key. Transaction server 239 or aggregator 237 can then prepare user inquiry response files according to the subkeys either submitted with or assigned to the original user inquiries submitted by the plurality of information requesters in step 6. The user inquiry response files can then be routed to each information requester based on corresponding subkeys.

For example, information requester A 205 may have submitted a user inquiry including a request for the amount a particular user spent on consumer goods in transactions greater than $100 over the past 12 months across all accounts associated with that user. In such a scenario, the user inquiry response file can include an aggregated report for transactions for consumer goods greater than $100 dollars summed over the past 12 months across all user accounts associated with that particular user. Such a report can include a sum of the dollar amount of all relevant transactions or it can include the number of relevant transactions. As mentioned above, such a user inquiry can be tagged with the subkey. The specific data and depth of detail requested by each information requester can depend on each information requester's internal credit or bankruptcy risk management policies, protocols and regulations. Different information requesters can have different bankruptcy risk, credit risk and account management indicators.

In step 7, transaction server 239 or aggregator 237 can parse out the aggregated reports into individual user inquiry response files according to super keys or sub keys and then send the individual user inquiry response files to the information requesters corresponding to the subkeys. This step provides each information requester only the information requested in each information requesters' original user inquiry.

In response to the user inquiry response file, information requesters can query user 260 to verify information reported in the individual user inquiry response files in step 8. The step is usually an investigative step to determine if there are any reasons or concerns regarding surprising information discovered in the individual user inquiry response file. For example, the information requested by a particular information requester in a user inquiry can be for the purpose of predicting or detecting a risk of the particular user declaring bankruptcy. Although each information requester, such as a credit card issuer, can have its own internal bankruptcy prediction policies, protocols and regulations, a typical user inquiry used to predict or detect the risk of bankruptcy, can include information that would indicate a build up of credit card balances, depletion of personal checking and savings accounts, increased rate of credit card or personal loan applications. While such indicators are set forth as examples of possible indicators of bankruptcy, the aforementioned list should not be considered exhaustive. Each information requester can have its own methodology for predicting and detecting the risk of bankruptcy or other credit risks and may wish to question the user 260 for purposes of evaluating the credit worthiness of the user "consumer."

Once user 260 is contacted by one of the information requesters in step 8, user 260 can take the opportunity to contact the user office 250 that represents any one of the information requesters, network 230 or data source 240 to request information on file about them in an aggregated report, communicate any financial difficulties, dispute the information represented in the aggregated report or clarify any mistakes or inconsistencies in data regarding the user 260. In some embodiments, user office 250 can then report any corrections or verifications to network 230 in step 10.

Figure 3:
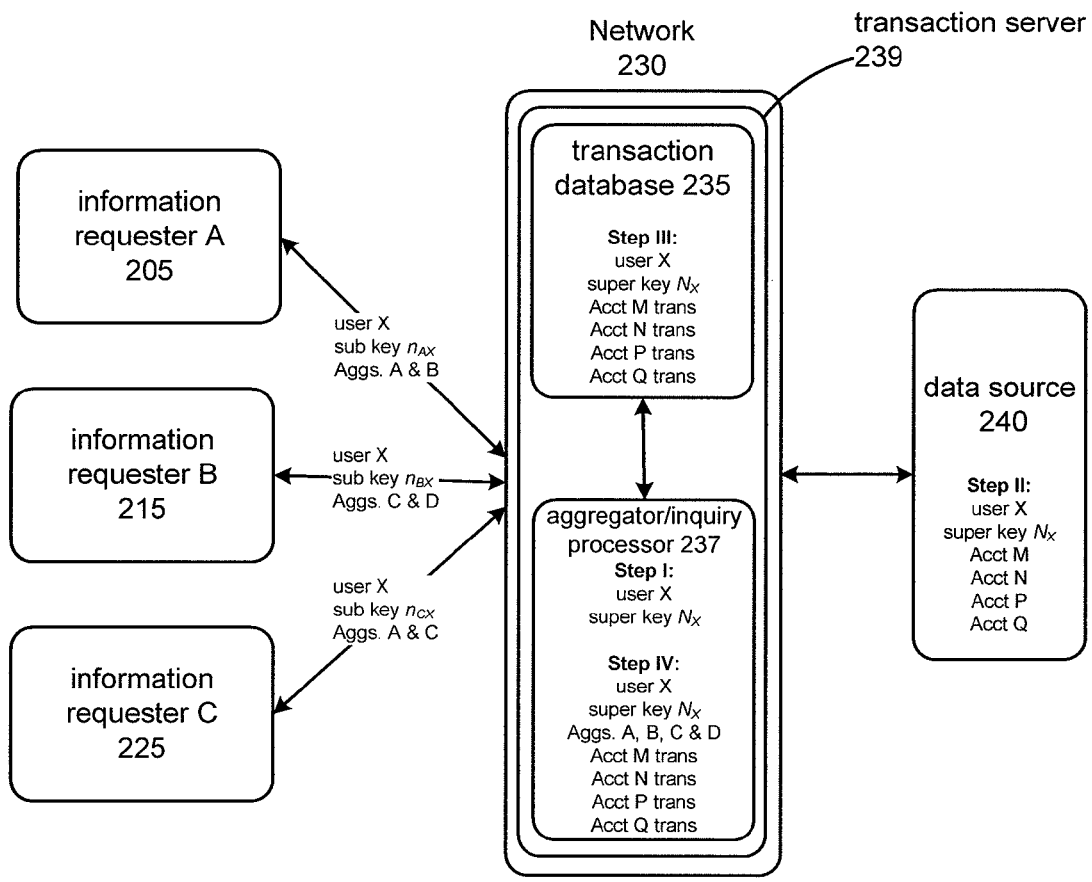
FIG. 3 depicts a schematic diagram of a system for reporting aggregated transaction level data to multiple information requesters according to one embodiment of the present invention.

FIG. 3 illustrates a system and the steps of combining user inquiries from multiple information requesters with general examples of requested aggregates, subkeys and super keys. As shown, information requester A 205, information requester B 215 and information requesters C 225 each submit separate user inquiries. Information requester A 205 can submit an inquiry about user X and including requests for aggregates A and B. Aggregates A and B can be specific requests for information according to the internal risk and bankruptcy management policies, protocols and regulations of information requester A 205. For example, Aggregate A can be request for the total dollar amount of purchases user X across all accounts associated with user X for the past 2 months. In some embodiments, user inquiry submitted by information requester A 205 can include a subkey $n_{ax}$. Additionally, information requester B 215 can submit a user inquiry about user X including requests for aggregates C and D. In some embodiments, the user inquiry submitted by information requester B 215 can include a subkey $n_{bx}$. Finally, information requester C 225 can submit an inquiry about user X and include a request for aggregates A and C. In some embodiments, user inquiry submitted by information requester C 225 can include a subkey $n_{cx}$. In other embodiments, the user inquiries sent to network 230 by information requesters do not have subkeys assigned. In such embodiments, the aggregator 237 assigns each of the subkeys to the incoming user inquiries.

When transaction server 239 receives the submitted user inquiries, it analyzes the inquiries to determine if any of the user inquiries are related to the same user or comprise requests for duplicate aggregates. As shown in FIG. 3, each of the user inquiries submitted by the information requesters are all related to user X and transaction server 239 or aggregator 237 can assign a super key $N_x$ to user X, the corresponding incoming user inquiry and associated subkeys in step I. Similarly, transaction server 239 or aggregator 237 can detect that the user inquiries submitted by information requester A 205 and information requester C 225 both include requests for aggregate A. As such, aggregator 237 can determine that there are 3 user inquiries regarding user X comprising two duplicate requests for aggregate A related to user X. Aggregator 237 can combine the three incoming user inquiries into one combined user inquiry file as well as assign it a super key $N_x$ that can link user X to aggregates A, B, C and D and the corresponding subkeys.

Aggregator 237 can submit the combined user inquiry file, the user identifier for user X and the associated super key $N_x$ to one or more data sources. In some embodiments, data sources can include data source 240 and/or transaction database 235. The data sources to which the combined user inquiry file is sent is determined by the type of information requested by the individual information requesters in the original user inquiries. For example, the aggregated user inquiry file can be sent to transaction database 235 if the included inquiries request transaction level details. In other embodiments, the aggregated user inquiry file to be sent to data source 240, such as a credit reporting bureau, if the included inquiries request account or credit worthiness details. In the cases in which data source 240 is a credit reporting bureau such as Experian® or Equifax®, the source 240 can supply credit scores, the amount and age of any outstanding credit card balances or other information that can be used to predict or detect risk of user X declaring bankruptcy. Additionally, data source 240 can provide account numbers or account identifiers for accounts associated with user X.

In various embodiments, aggregator 237 submits a linkage request file to data source 240 which can include identifiers for user X, super key $N_x$ and requests for some or all of the accounts associated with user X. In response, source 240, in step II, can return accounts M, N, P and Q associated with user X to transaction server 239 in a linkage response file. Data source 240, transaction server 239 or aggregator 237 can link user X or super key $N_x$ with accounts M, N, P and Q in step II.

Figure 4:
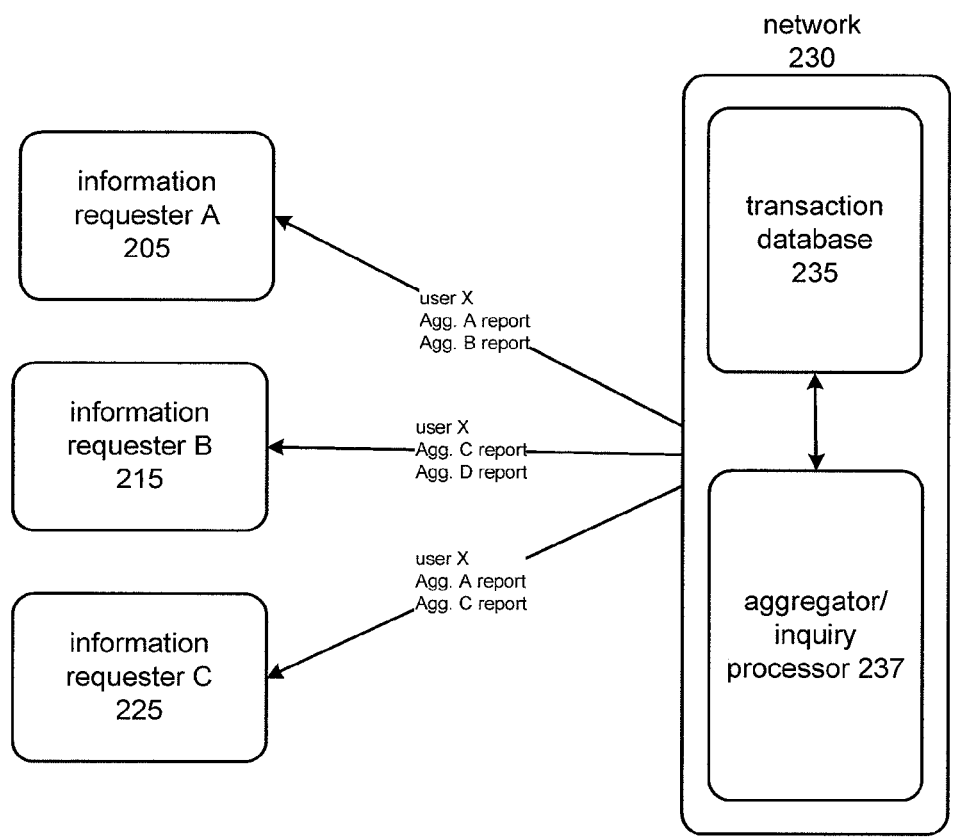
FIG. 4 depicts a system for providing aggregated transaction level data according to one embodiment of the present invention.

In step III, transaction database 235 can receive a request for all raw transaction level data regarding accounts M, N, P and Q associated with user X from aggregator 237. Transaction database 235 can return all requested transaction level data to aggregator 237. In step IV, aggregator 237 will run various reports and analysis to generate aggregates A, B, C and D and link the results to super key N. Based on the super key $N_x$ and its links to the subkeys $n_{ax}$, $n_{bx}$, and $n_{cx}$, network 230 or aggregator 237 can send the appropriate user inquiry response files to information requester A 205, information requester B 215 and information requester C 225 and shown in FIG. 4.

Raw and Aggregated Transaction Level Data

Figure 5:
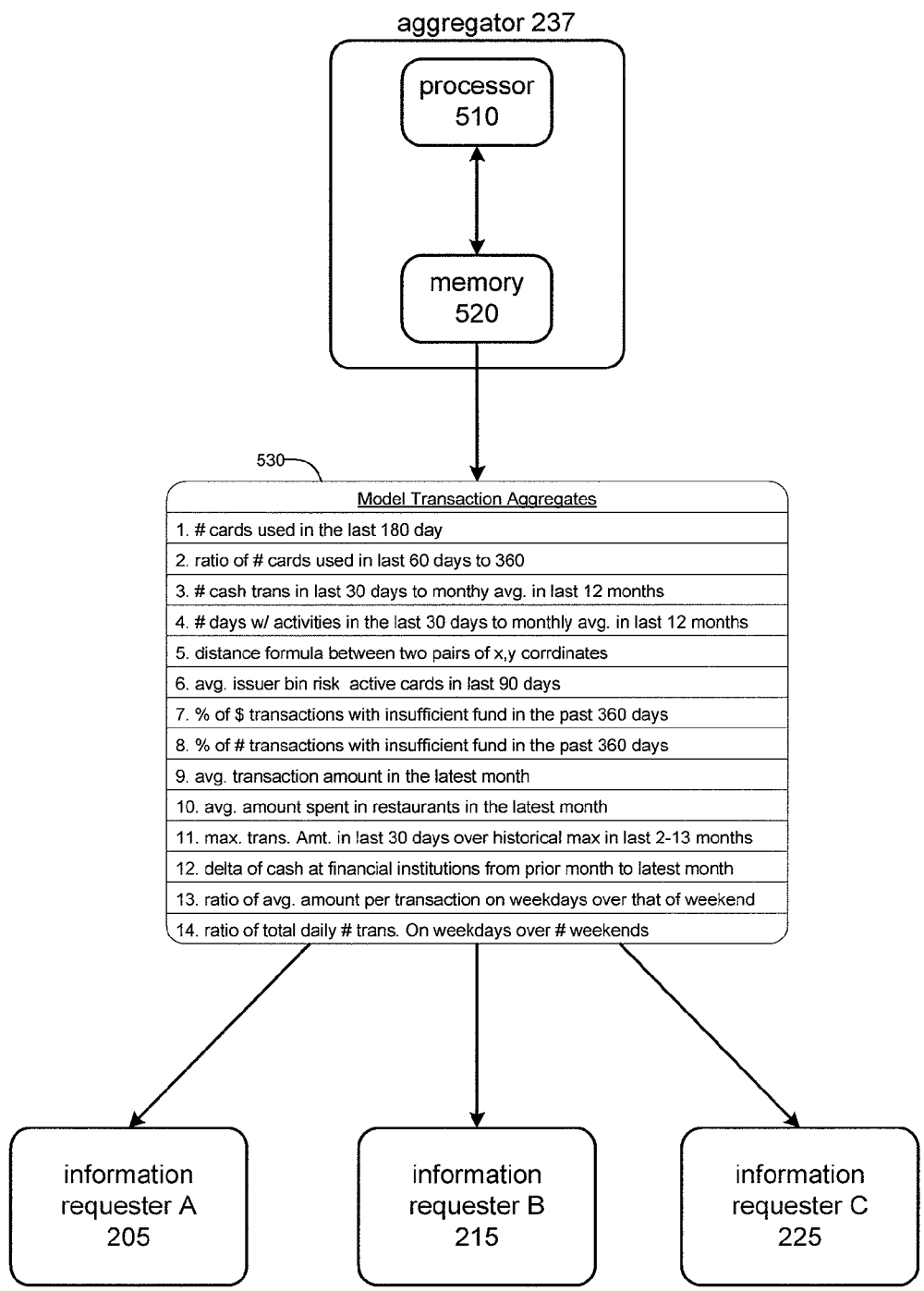
FIG. 5 depicts a system and representative aggregated transaction level data according to one embodiment of the present invention.

FIG. 5 depicts a system and method for providing predefined model or customized transaction aggregates to multiple information requesters. To facilitate fast, efficient and cost-effective risk management, network 230 or aggregator 237 can send a partial or complete list of model transaction aggregates 530 to information requesters A 205, B 215 and C 225. The sample list of fourteen model transaction aggregates shown in model transaction aggregates 530 is not exhaustive. One of ordinary skill in the art will recognize many forms of derived, calculated or collected transaction level details can be determined for various periods of time, types of transactions or locations. Various examples and methods of determining, defining and calculating "factors" and "clusters" can be found in commonly owned and currently pending U.S. patent application Ser. No. 12/537,566 filed on Aug. 7, 2009, which is herein incorporated by reference for all purposes.

In some embodiments, network 230 or aggregator 237 can provide all possible or allowable transaction aggregates to each subscribing information requester in list of model transaction aggregates 530. In other embodiments, each information requester can customize or define the transaction aggregates that aggregator 237 reports back. In other embodiments, information requesters can select from the predefined aggregates in the list of model transaction aggregates 530 as well as define some number of customized transaction level aggregates suited to its own internal credit, bankruptcy or other risk management policies, protocols or regulations. In such embodiments list of model transaction aggregates 530 can be provided to information requesters as a template to information requesters for use in defining their own transaction level aggregates.

The list of model transaction aggregates 530 can be stored in memory 520 in aggregator 237. Alternatively, the list of model transaction aggregates 530 can be stored elsewhere in network 230. List of model transaction aggregates 530 can be provided to information requesters and referenced by aggregator 237 over appropriate electronic communication media. Embodiments in which aggregator 237 includes a processor 510 and memory 520, processor 510 can access the list of model transaction aggregates 530 stored in memory 520 by internal bus or other electronic communication medium within aggregator 237.

Examples of transaction aggregates that can be included in the lists of model transaction aggregates 530 include, but are not limited to, reports on the number of accounts used in the past 180 days, the ratio of the number of accounts used in the last 60 days to the number of accounts used in the last 365 days, the average transaction amount in the last month, the difference between the amount of cash advances in a financial institution from one month to another, the ratio of the total daily number of transactions compared between weekdays and weekends, etc. The foregoing list should be viewed as illustrative and not limiting.

Figure 6:
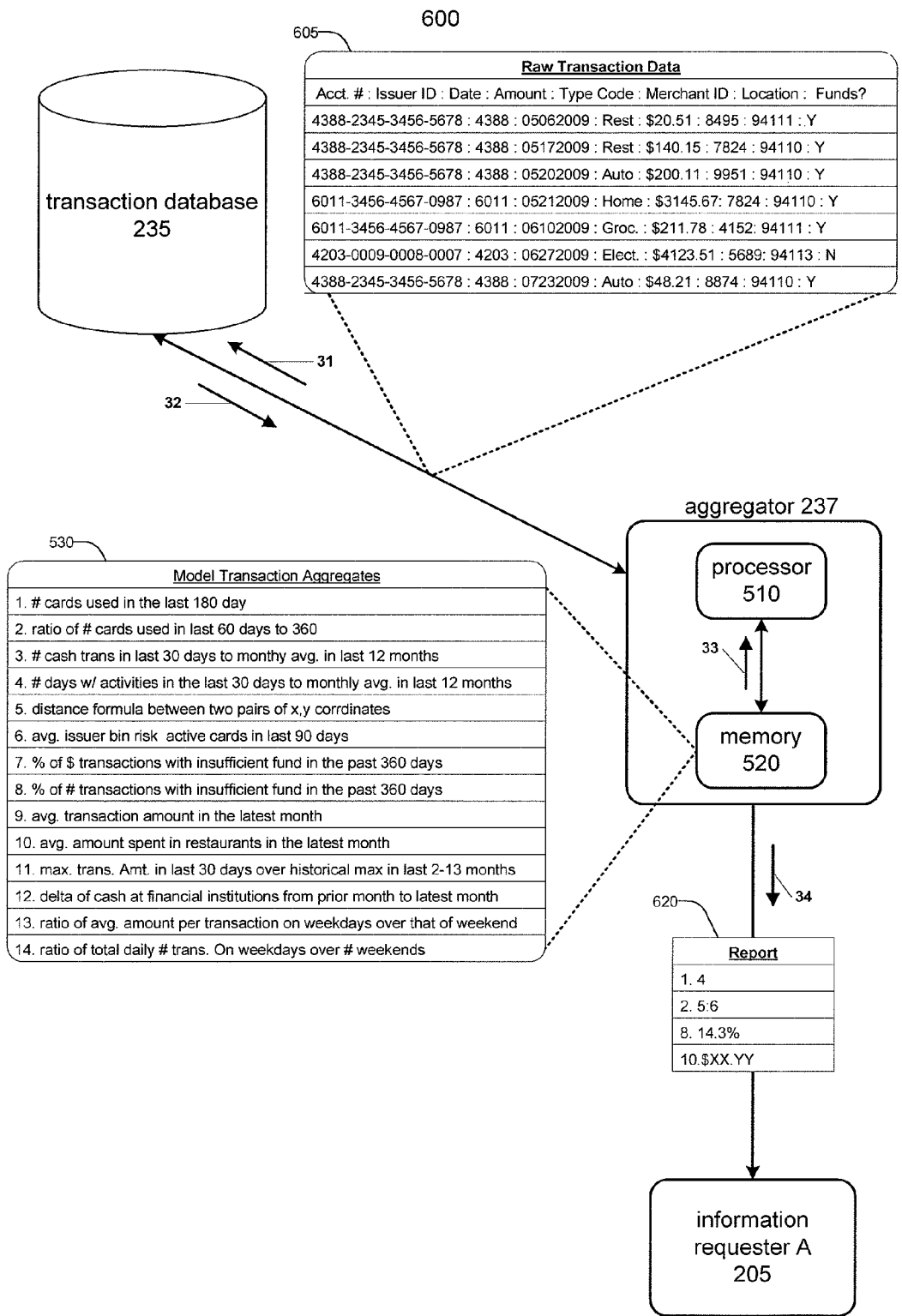
FIG. 6 depicts a system, raw transaction level data and representative aggregated transaction level data according to one embodiment of the present invention.

FIG. 6 depicts a system and method for obtaining raw transaction level data and determining transaction level data aggregates according to various embodiments of the present invention. FIG. 6 also depicts a system and method for reporting the determined transaction level data aggregates to one or more information requesters according to the information requested by each information requester. As mentioned above, each information requester may request various predetermined transaction level data aggregates or define their own custom transaction level data aggregates.

As shown, aggregator 237 can include processor 510 and memory 520. In such embodiments, aggregator 237 can be appropriately configured computer or server. Memory 520 can include a list of model transaction aggregates 530 they can be referenced by processor 510 when aggregator 237 receives a transaction data inquiry file from an information requester. Transaction inquiry file can include user identification information and/or a super key to identify a particular user for whom information requester would like transaction level data aggregates. Aggregator 237 can send the user identification information to transaction database 235. This step in the method is represented by arrow 31 indicating the transmission of a user inquiry file from aggregator 237 to transaction database 235 over an appropriate electronic communication medium.

Aggregator 237, which may or may not be a part of network 230, can receive a user inquiry file from an information requestor and can parse out individual user identification information from the file and then run a database report for the historical or geographical ranges that can be indicated in the user inquiry file. Alternatively, transaction database 235 can return all transaction level data for all accounts associated with a particular user stored in transaction database 235. The information can then be parsed in later steps and by other components of system 600. Transaction database 235 can include real-time transaction level data for all accounts associated with any or all users identified in the user inquiry file.

In response to a user inquiry file, transaction database 235 can return raw transaction data 605. The raw transaction data 605 can include transaction level data elements such as account number, issuer ID, the dates the transaction, the type of the transaction, the amount of the transaction, and merchants identification, location and the flag as to whether sufficient funds were available in the account for that particular transaction. In this way, each transaction can be indicated as a line item and include successful, rejected or attempted transactions. One of ordinary skill in the art will realize that other data for each transaction can be included in each line item or record of raw transaction data. For instance, the raw transaction data can include whether the transaction was initiated at a point of sale device, over the Internet or over the telephone. The only limit on the type of information included in each line item or record of the raw transaction data is the depth of the data store by transaction database 235.

In step 32, transaction database 235 can send a transaction data response file to aggregator 237 via an appropriate electronic communication medium. Transaction data response file can include raw transaction data 605, a key or a super key or any other information that can be used to process, organize or identify the contents of the transaction data response file or route the same to the correct information requester. In addition, the transaction data response file can include raw transaction data 605 for more than one user. In this way, transaction database 235 can process reports for multiple users and can send the resulting transaction data response file in the minimal number of electronic communications.

Aggregator 237 can receive transaction data response file and parse the data therein according to the requests for transaction level aggregates from one or more information requesters. Parsing the data in the transaction data response file can include separating or grouping raw transaction data 605 records according to the associated user. Parsing the data in the transaction data response file can also include selecting or extracting raw transaction data line items or records based on certain transaction data elements such as date ranges, amounts, day of the week, type of transaction etc. Parsing the data in the transaction data response file can also include extracting transaction data elements based on transaction level data element identifiers.

Once the raw transaction data is appropriately parsed, grouped or separated, aggregator 237 can then determine one or more transaction aggregates as requested by one or more information requesters or recommended or suggested by network 230 or aggregator 237. In some embodiments, processor 510 can retrieve the list of model transaction aggregates 530 from memory 520 in step 33. If the transaction aggregates requested by the information requesters is listed in the list of model transaction aggregates 530, then those aggregates can be identified by an aggregate number or other appropriate identifier. In such embodiments, the aggregate identifier can be shorthand for indicating which aggregates a particular information requester wants for a particular user. The list of model transaction aggregates 530 can be used a menu of predefined transaction level data aggregates.

One example of a predefined transaction data aggregates that aggregator 237 can produce is a tally of the number of accounts used in the last 100 days as defined by model transaction aggregate definition number 1 listed in the list of model transaction aggregates 530. If information requesters would like such information, that information requester can indicate they would like aggregate definition number 1 in the user inquiry file it sends to aggregator 237. Alternatively, an information requester may request aggregator 237 to calculate the average transaction amount in the last month by summing the amounts of each successful transaction executed within the last 30 days or calendar month and then dividing by the total number of transactions executed within that same timeframe as defined in model transaction aggregate definition number 9 in the list of model transaction aggregates 530. To do so, information requester can send a properly formatted user inquiry file including requests for transaction aggregate definition number 9 along with the date range for which they would like the calculated data. User inquiry file can also include, along with a request for the predefined transaction aggregates listed in the list of model transaction aggregates 530, definitions and specific instructions for custom information requester defined transaction aggregates suited to the information requester's internal credit risk or bankruptcy risk management policies, protocols or regulations. One of ordinary skill in the art will recognize that many other useful transaction aggregates can be defined and/or included in the list of model transaction aggregates 530 without departing from the spirit or scope of the present invention.

When aggregator 237 has determined a predetermined number of transaction data aggregates, it can prepare and send a report 620 to one or more information requesters. Report 620 can be formatted in a number ways according to the standards of aggregator 237 or the requirements of the requesting information requester. In some embodiments, report 620 can return each aggregate along with its associated transaction data aggregate definition identifier. For example, report 620 lists four line items numbered 1, 2, 8 and 10. These line items correspond to the transaction data aggregate definition numbers listed in the list of model transaction aggregates 530. As such, the first piece of data listed in report 620 shows 1. 4 and corresponds to the 4 cards used in the last 180 days by the user associated with the initial user inquiry file and the corresponding transaction data inquiry file. Similarly, the second piece of data in report 620 shows 2. 5:6 and indicates a ratio of 5 cards used in the last 60 days to the 6 cards used the last 360 days. The third piece of data shows 8. 14.3% and indicates that 14.3% of the transactions in the last 360 days were rejected or otherwise handled as having insufficient funds. The final piece of data shown in report 620 indicates 10. $XX.YY indicating that the amount spent in restaurants in the latest month was $XX.YY. In other embodiments report 620 can also include information requester defined custom transaction aggregates and associated aggregate definition identifiers.

Figure 7:
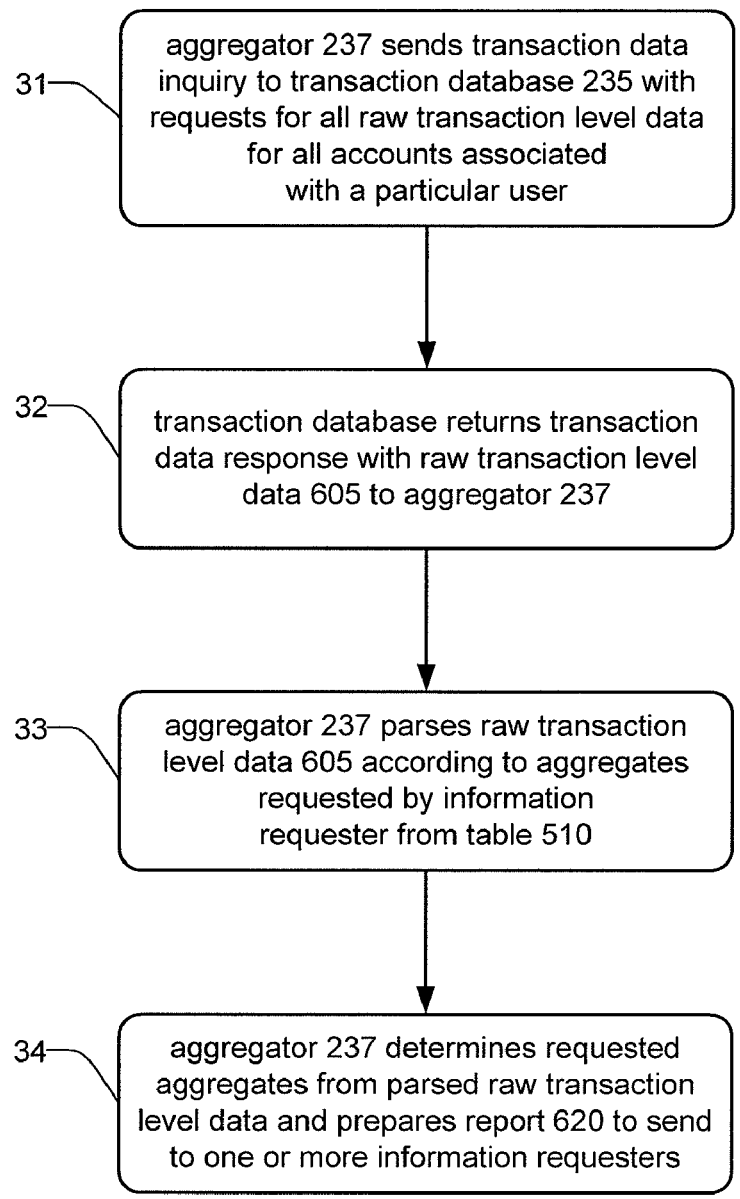
FIG. 7 depicts a flow chart of a method of compiling transaction level aggregates according to one embodiment of the present invention.

FIG. 7 depicts a flow chart of a method 700 for determining transaction level data aggregates according to various embodiments of the present invention. The step numbers of method 700 correspond to the arrows indicating dataflow in system 600 depicted in FIG. 6. At step 31, aggregator 237 can send one or more transaction data inquiries to transaction database 235 with requests for all or some of the raw transaction level data for all accounts associated with a particular user. The accounts associated with a particular user can include credit card accounts, credit line accounts, checking accounts, savings accounts, money market accounts as well as any other financial or nonfinancial accounts held by particular user. Transaction database 235 can be a payment processing network with an associated transaction database that may or may not be updated in real time.

At step 32, transaction database can return a transaction data response including any and all raw transaction level data 605 requested by the information requester or aggregator 237 back to aggregator 237. As previously mentioned, the raw transaction level data 605 can include any transaction level data elements associated with any number of individual transactions and accounts. In the credit card industry, a raw transaction level data record can include transaction level data elements such as an issuer identifier, a merchant identifier, a date, a location, a transaction type identifier, etc.

A step 33, aggregator 237 parses the raw transaction level data 605 according to aggregates requested by information requester. In some embodiments, the raw transaction level data 605 is parsed according to a predefined transaction aggregate listed in the list of model transaction aggregates 510. Parsing the raw transaction level data 605 can include separating out individual transactions level data records or line items according to the type or values of transaction level data elements included in the transaction level data record or line item. In some embodiments, parsing the transaction level data 605 can include separating out individual transaction level data records based on a data range, for example a date range, indicated by one or more transaction level data elements. It is therefore possible to select transaction level data records within a certain date range or value range by looking at the date or value of particular transaction level data elements within the transaction level data records.

Once the raw transaction level data 605 is parsed, aggregator 237 can determine the transaction level aggregates according to aggregates requested by each information requester. Aggregator 237 can then send a report 620 to the information requesters using information requester identification codes, keys, PINs, user identifiable information (name, address, & ssn), or super keys so that each information requester receives the transaction level data aggregates it originally requested.

Figure 8:
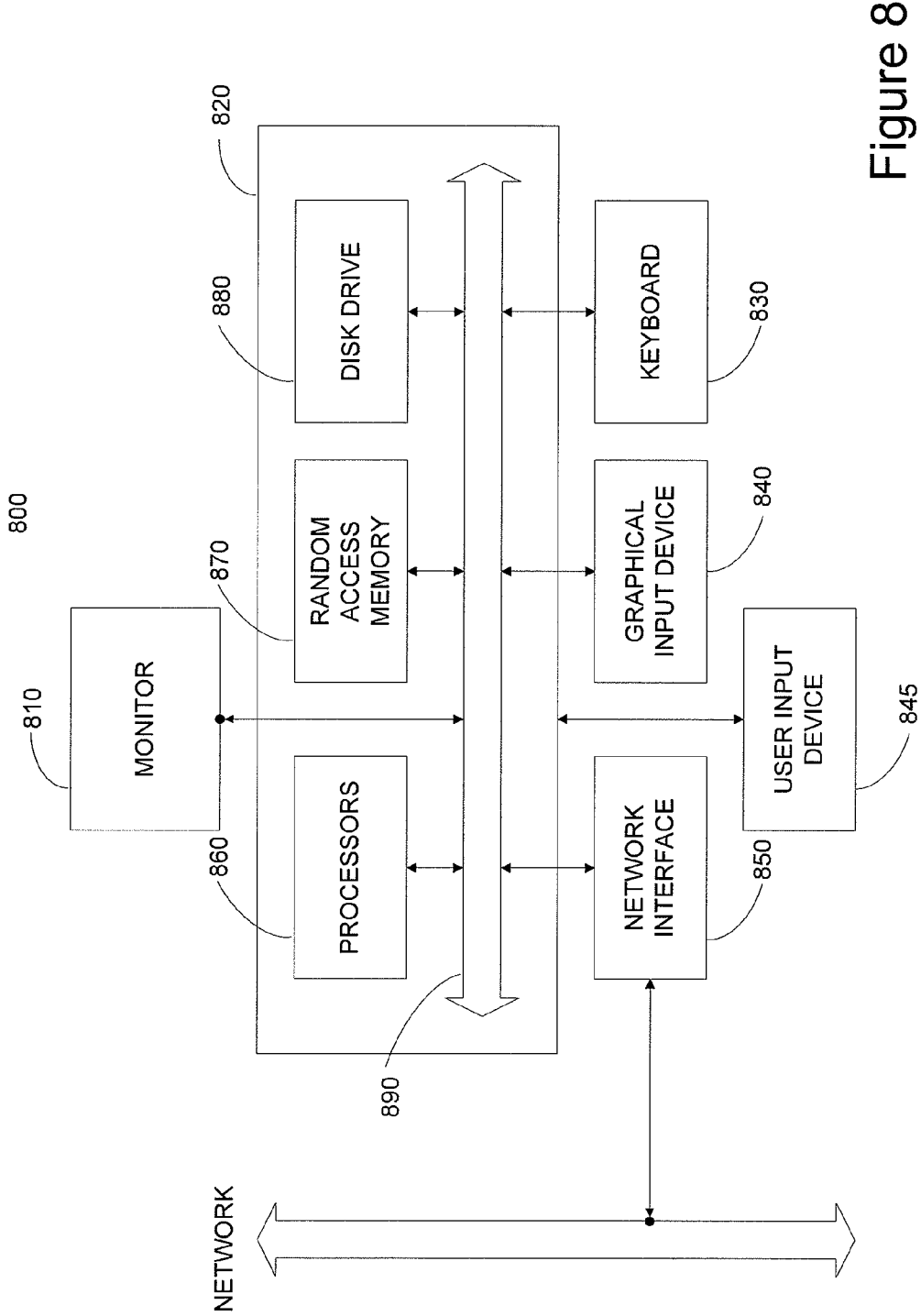
FIG. 8 is a schematic of a computer system that can be used to implement various embodiments of the present invention.

FIG. 8 is a block diagram of typical computer system 800 configured to execute computer readable code to implement various functions and steps according to various embodiments of the present invention.

System 800 is representative of a computer system capable of embodying the present invention. The computer system can be present in any of the elements in FIGS. 2 through 4, including the transaction server 239, transaction database 235 and aggregator 237 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 800 typically includes a display 810, computer 820, a keyboard 830, a user input device 840, computer interfaces 850, and the like. In various embodiments, display (monitor) 810 may be embodied as a CRT display, an LCD display, a plasma display, a direct-projection or rear-projection DLP, a microdisplay, or the like. In various embodiments, display 810 may be used to display user interfaces and rendered images.

In various embodiments, user input device 840 is typically embodied as a computer mouse, a trackball, a track pad, a joystick, wireless remote, drawing tablet, voice command system, and the like. User input device 840 typically allows a user to select objects, icons, text and the like that appear on the display 810 via a command such as a click of a button or the like. An additional specialized user input device 845, such a magnetic stripe, RFID transceiver or smart card reader may also be provided in various embodiments. In other embodiments, user input device 845 include additional computer system displays (e.g. multiple monitors). Further user input device 845 may be implemented as one or more graphical user interfaces on such a display.

Embodiments of computer interfaces 850 typically include an Ethernet card, a modem (telephone, satellite, cable, ISDN), (asynchronous) digital subscriber line (DSL) unit, FireWire interface, USB interface, and the like. For example, computer interfaces 850 may be coupled to a computer network, to a FireWire bus, or the like. In other embodiments, computer interfaces 850 may be physically integrated on the motherboard of computer 820, may be a software program, such as soft DSL, or the like.

RAM 870 and disk drive 880 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 820 typically includes familiar computer components such as a processor 860, and memory storage devices, such as a random access memory (RAM) 870, disk drives 880, and system bus 890 interconnecting the above components.

In some embodiments, computer 820 includes one or more Xeon microprocessors from Intel. Further, in the present embodiment, computer 820 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for deriving aggregated transaction data comprising:
    sending a user inquiry file to a data source from an aggregator server; wherein the user inquiry file comprises a specific consumer level information for one or more users;
    receiving at the aggregator server a linkage response file from the data source based on the user inquiry file;
    parsing the linkage response file to determine a user account identifier using the aggregator server, wherein the user account identifier is unavailable prior to receiving the linkage response file;
    generating a transaction data inquiry file comprising the user account identifier using the aggregator server;
    sending the transaction data inquiry file from the aggregator server to a transaction database;
    receiving at the aggregator server a transaction data response file from the transaction database in response to the transaction data inquiry file;
    parsing the transaction data response file according to the user inquiry file using the aggregator server; and
    determining aggregated transaction data from the parsed transaction data response file using the aggregator server;
    wherein the transaction data response file comprises raw transaction level data having transaction data records for all accounts associated with a particular user;
    wherein the aggregated transaction data is based on customized transaction aggregates defined by one or more information requesters; and
    wherein parsing the transaction data response file comprises extracting transaction data elements based on a plurality of transaction level data element identifiers.

2. The method of claim 1 furthering comprising generating a report file including the aggregated transaction data using the aggregator server and sending the report file to one or more information requesters.

3. The method of claim 1 wherein the raw transaction level data further comprises a plurality of transaction level data elements.

4. The method of claim 3 wherein parsing the transaction data response file comprises grouping the transaction level data records according to the transaction data level elements.

5. The method of claim 1 wherein the aggregated transaction data comprises a bankruptcy risk management indicator.

6. The method of claim 1 wherein the aggregated transaction data is based on a model transaction aggregate.

7. The method of claim 6 wherein the model transaction aggregate comprises a bankruptcy risk management aggregate.

8. A system for deriving aggregated transaction data comprising:
    a memory; and
    a processor;
    wherein the processor is configured to send a user inquiry file to a data source, receive a linkage response file in response to the user inquiry file from the data source, parse the linkage response file to determine a user account identifier, generate a transaction data inquiry file comprising the user account identifier, send the transaction data inquiry file to a transaction database, receive a transaction data response file based on the transaction data inquiry file, parse the transaction data response file according the user inquiry file using, and determine aggregated transaction data from the parsed transaction data response file; and wherein the user inquiry file comprises a specific consumer level information for one or more users;

wherein the user account identifier is unavailable prior to receiving the linkage response file wherein the transaction data response file comprises raw transaction level data having transaction data records for accounts associated with a particular user;

wherein the aggregated transaction data is based on customized transaction aggregates defined by one or more information requesters; and wherein parsing the transaction data response file comprises extracting transaction data elements based on a plurality of transaction level data element identifiers.

9. The system of claim 8 wherein the processor is further configured to generate a report file including the aggregated transaction data and send the report file to one or more information requesters.

10. The system of claim 8 wherein the raw transaction level data further comprises a plurality of transaction level data elements.

11. The system of claim 10 wherein the processor is further configured to group the transaction level data records according to the transaction data level elements.

12. The system of claim 10 wherein the processor is further configured to extract transaction data elements from the transaction data response file based on a plurality of transaction level data element identifiers.

13. The system of claim 8 wherein the aggregated transaction data comprises a bankruptcy risk management indicator.

14. The system of claim 8 wherein the aggregated transaction data is based on a plurality of model transaction aggregates.

15. The system of claim 14 wherein the model transaction aggregates comprise a selection of bankruptcy risk management indicator aggregates.

* * * * *